US012609518B2

(12) United States Patent
Lowe et al.

(10) Patent No.: US 12,609,518 B2
(45) Date of Patent: Apr. 21, 2026

(54) BREAK-AWAY COUPLER FOR AERIAL CABLE CLAMP AND INTEGRATED CABLE CUTTER

(71) Applicant: CommScope Technologies LLC, Hickory, NC (US)

(72) Inventors: Scott L. Lowe, Conover, NC (US); Daniel J. Parke, Hickory, NC (US); Robert A. Wessels, Jr., Hickory, NC (US)

(73) Assignee: CommScope Technologies LLC, Hickory, NC (US)

( * ) Notice: Subject to any disclaimer, the term of this patent is extended or adjusted under 35 U.S.C. 154(b) by 967 days.

(21) Appl. No.: 17/852,819

(22) Filed: Jun. 29, 2022

(65) Prior Publication Data

US 2022/0329057 A1 Oct. 13, 2022

Related U.S. Application Data

(63) Continuation of application No. PCT/US2021/015127, filed on Jan. 26, 2021.
(Continued)

(51) Int. Cl.
*H02G 7/18* (2006.01)
*F16G 11/02* (2006.01)
(Continued)

(52) U.S. Cl.
CPC .............. *H02G 7/18* (2013.01); *F16G 11/02* (2013.01); *F16G 11/04* (2013.01); *H02G 7/04* (2013.01); *F16B 2200/63* (2023.08)

(58) Field of Classification Search
CPC .. H02G 7/18; H02G 7/04; F16G 11/02; F16G 11/04; F16B 2200/63
(Continued)

(56) References Cited

U.S. PATENT DOCUMENTS

| | | | | |
|---|---|---|---|---|
| 2,149,070 A | * | 2/1939 | Poinan ...................... | H02G 7/18 191/40 |
| 2,549,497 A | * | 4/1951 | Matthews ................ | H02G 7/18 83/639.4 |

(Continued)

FOREIGN PATENT DOCUMENTS

| | | | | |
|---|---|---|---|---|
| CN | 105633889 A | * | 6/2016 | ............... H02G 7/04 |
| EP | 2198696 A1 | | 6/2010 | |

(Continued)

*Primary Examiner* — Taylor Morris
(74) *Attorney, Agent, or Firm* — Muncy, Gelssler, Olds & Lowe, P.C.

(57) ABSTRACT

A breakaway coupler includes a main body and a secondary body, removably attached to the main body. First and second attachment features are formed on the main and secondary bodies to permit attachment to first and second structures. A breakaway member connects the main and secondary bodies. A guide channel passes through an overlapped portion of the main and secondary bodies and accepts a cable therein. A blade passes across the guide channel to sever the cable when the secondary body is detached from the main body. In operation, a cable clamp frictionally holds the cable. The cable clamp is connected to the breakaway coupler, which is in turn connected to a fixed structure, e.g., a pole. When an excess force is applied to the cable, the main and secondary bodies of the breakaway coupler separate and the blade cuts the cable in the guide channel.

16 Claims, 15 Drawing Sheets

Related U.S. Application Data

(60) Provisional application No. 62/967,566, filed on Jan. 29, 2020.

(51) Int. Cl.
  F16G 11/04     (2006.01)
  H02G 7/04     (2006.01)

(58) Field of Classification Search
  USPC ......................................................... 248/548
  See application file for complete search history.

(56) References Cited

U.S. PATENT DOCUMENTS

| | | | | |
|---|---|---|---|---|
| 3,621,744 | A | | 11/1971 | Kelly |
| 3,882,748 | A | * | 5/1975 | Moore .................... B23D 23/00 |
| | | | | 83/543 |
| 3,922,104 | A | * | 11/1975 | McCullough ........... F16G 11/00 |
| | | | | 403/296 |
| 3,926,252 | A | | 12/1975 | Ribeyre et al. |
| 3,962,943 | A | | 6/1976 | Allen |
| 4,653,776 | A | | 3/1987 | Borg |
| 4,662,710 | A | | 5/1987 | ten Berge |
| 4,687,365 | A | | 8/1987 | Promersberger |
| 4,698,717 | A | * | 10/1987 | Scheid ...................... H02G 7/18 |
| | | | | 361/114 |
| 4,939,821 | A | * | 7/1990 | Frank, Jr. ............... H02G 7/056 |
| | | | | 24/115 M |
| 5,122,007 | A | | 6/1992 | Smith |
| 5,142,745 | A | * | 9/1992 | Setty ....................... F16G 11/02 |
| | | | | 24/115 M |
| 5,177,317 | A | * | 1/1993 | Walker .................... F42B 3/006 |
| | | | | 114/221 A |
| 5,226,216 | A | | 7/1993 | Pizzi |
| 5,315,064 | A | * | 5/1994 | Andrews .............. H01R 13/633 |
| | | | | 439/258 |
| 5,470,118 | A | * | 11/1995 | Burton .................... E21B 31/12 |
| | | | | 294/86.18 |
| 5,553,960 | A | * | 9/1996 | Turer ..................... B62M 9/128 |
| | | | | 403/19 |
| 5,599,129 | A | | 2/1997 | Clifton et al. |
| 5,607,248 | A | | 3/1997 | Hasse |
| 5,678,609 | A | | 10/1997 | Washburn |
| 5,816,758 | A | * | 10/1998 | Huber .................... B64D 9/003 |
| | | | | 403/2 |
| 6,007,267 | A | | 12/1999 | VanHorn |
| 6,111,193 | A | * | 8/2000 | Auclair .................. H02G 7/053 |
| | | | | 174/44 |
| 6,250,835 | B1 | * | 6/2001 | Chamel ................... E01F 9/635 |
| | | | | 248/548 |
| 6,397,948 | B1 | | 6/2002 | Williams et al. |
| 6,526,858 | B1 | | 3/2003 | Smith et al. |
| 6,554,524 | B1 | * | 4/2003 | Smith ...................... H02G 7/04 |
| | | | | 403/322.2 |
| 6,581,251 | B2 | | 6/2003 | Malin |
| 6,776,554 | B2 | * | 8/2004 | Acciacca ................ E05B 79/20 |
| | | | | 292/225 |
| 7,290,748 | B2 | | 11/2007 | McDonald |
| 8,028,466 | B1 | * | 10/2011 | Schrock ................. A01K 75/00 |
| | | | | 114/221 A |
| 8,517,317 | B2 | | 8/2013 | Malin |
| 8,556,223 | B2 | * | 10/2013 | Balfour .................. H02G 7/056 |
| | | | | 248/548 |
| 11,466,519 | B2 | * | 10/2022 | Cosse .................... E21B 17/046 |
| 12,368,292 | B2 | * | 7/2025 | Parke ..................... H02G 7/056 |
| 2002/0014944 | A1 | | 2/2002 | Dinsmore |
| 2003/0188432 | A1 | | 10/2003 | Temple |
| 2004/0035984 | A1 | | 2/2004 | Franks et al. |
| 2004/0161218 | A1 | | 8/2004 | Sloan et al. |
| 2005/0254768 | A1 | | 11/2005 | Franks |
| 2015/0183623 | A1 | | 7/2015 | Wacinski et al. |
| 2019/0011657 | A1 | | 1/2019 | Baker et al. |

FOREIGN PATENT DOCUMENTS

| | | | | |
|---|---|---|---|---|
| WO | WO 2006/113088 | A2 | 10/2006 | |
| WO | WO 2017/075218 | A1 | 5/2017 | |
| WO | WO-2022115316 | A1 * | 6/2022 | ............... H02G 7/04 |

* cited by examiner

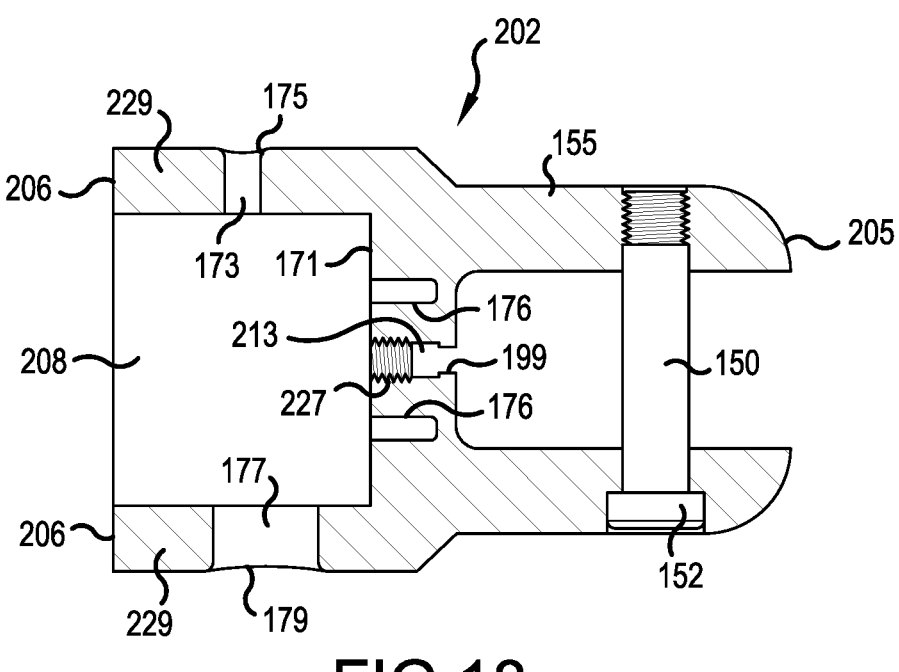
FIG.18
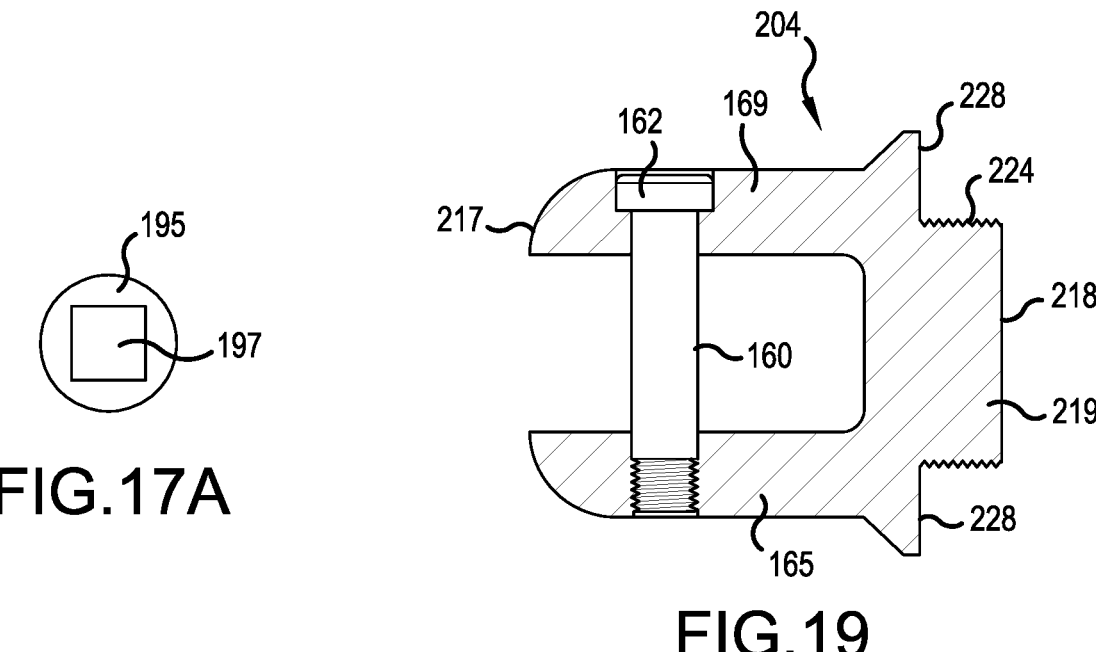
FIG.17A
FIG.19

BREAK-AWAY COUPLER FOR AERIAL CABLE CLAMP AND INTEGRATED CABLE CUTTER

This application is a continuation of International Application No. PCT/US2021/015127, filed Jan. 26, 2021, which claims the benefit of U.S. Provisional Application No. 62/967,566, filed Jan. 29, 2020, both of which are herein incorporated by reference.

BACKGROUND OF THE INVENTION

1. Field of the Invention

The present invention relates to a break-away coupler, sometimes referred to as a load-limited coupler, which separates to free a load from a support when a preset load limit is reached. More particularly, the present invention relates to a break-away coupler for attaching a cable clamp to a pole, which includes an integrated cable cutter to automatically cut a cable held directly or indirectly by the cable clamp when the break-away coupler separates to save the pole and any equipment mounted thereto from damage.

2. Description of the Related Art

A cable clamp is known in the prior art. The primary function of the cable clamp is to support the weight of the aerial span of cable. The cable clamp is anchored to a sturdy structure like a wall, roof eve or pole by an anchored bolt or the like.

Various cable clamps are known in the prior art and are marketed by companies, such as MacLean Senior Industries and Allied Bolt, Inc. Such cable clamps have been widely deployed, have gained acceptance in the market, and are shown in U.S. patents and Published U.S. Pat. Nos. 5,226, 216; 6,581,251; 8,517,317; 2004/0035984 and 2005/0254768, each of which is herein incorporated by reference.

U.S. Pat. Nos. 6,581,251 and 8,517,317 to Allied Bolt, Inc., which are herein incorporated by reference, will now be described in conjunction with prior art FIGS. 1-5. FIG. 1 is a perspective view of a clamp 1 of the prior art. The clamp 1 is provided with a shell 10, a shim 40, and a wedge 80. The shell 10, shim 40, and wedge 80 cooperate together to secure a cable 2 between the shell 10 and the shim 40. The wedge 80 is longitudinally insertable into the shell 10 and above the shim 40. The wedge 80 can bias the shim 40 against the cable 2 towards the shell 10 to keep the cable 2 in a desired locked position by a frictional force.

The shell 10 includes a first shell sidewall 11, a second shell sidewall 12, a first end 13 and a second end 14, as provided in FIG. 1. The sidewalls 11 and 12 increase in height along the longitudinal length of the shell 10 from the first end 13 to the second end 14. The first shell sidewall 11 and the second shell sidewall 12 are substantially the same and mirror images of each other. Thus, at the first end 13, the first shell sidewall 11 and the second shell sidewall 12 have a same first height, and at the second end 14, the shell sidewalls 11 and 12 have a same second height, which is greater than the first height. The shell 10 has a shell base 15 positioned between the shell sidewalls 11 and 12. The shell base 15 and the shell sidewalls 11 and 12 make an approximate U-shaped configuration.

The shim 40 is best seen in FIG. 2. The shim 40 has an inside surface that engages with the cable 2 and an outside surface that engages with the wedge 80. The shim 40 includes an elongate shim base 41 having a center longitudinal axis. The shim base 41 is substantially rectangular. The shim 40 has longitudinal sides 42, a first end 43 and a second end 44. End sections 45 are coupled to the first end 43 and the second end 44 of the shim 40. The end sections 45 have substantially smooth inner surfaces to prevent damage to the cable 2.

The shim 40 makes substantially an "I" formation with the positioning of the shim base 41 between the end sections 45. The end sections 45 in combination with the shim base 41 create inner corners 50 of the "I" formation. The end sections 45 fit outside the dimensions of the shell 10, so that the corners 50 create a stop abutment to capture the shim 40 within the shell 10, i.e., the corners 50 prevent the shim 40 from sliding out of the shell 10 longitudinally.

The shim base 41 can also include a friction engaging surface to increase a frictional coefficient between the cable 2 and the shim base 41. The friction engaging surface is located on the inside surface of the shim base 41. In one embodiment, the shim base 41 includes a plurality of holes 47 with raised edges surrounding the holes 47 and existing on the inside surface, so as to face the cable 2.

The wedge 80 is separately depicted in FIGS. 3 and 4. The wedge 80 is longitudinally insertable into the shell 10 in the direction of arrow A, in FIGS. 1 and 5. The wedge 80 is positioned above the shim 40 to bias the shim 40 against the cable 2 and towards the shell base 15 of the shell 10. The wedge 80 includes a wedge base 81, a first wedge sidewall 82 and a second wedge sidewall 83. The wedge base 81 is positioned between the first and second wedge sidewalls 82 and 83. The wedge base 81 and the wedge sidewalls 82 and 83 make an upward facing, approximately U-shaped configuration.

The first and second wedge sidewalls 82 and 83 increase in height along the length of the wedge 80 from a first end 84 to a second end 85 of the wedge 80. The first and second wedge sidewalls 82 and 83 are substantially the same and mirror images of each other. Thus, at the first end 84, the first wedge sidewall 82 and the second wedge sidewall 83 have the same shorter height and at the second end 85 of the wedge 80, the sidewalls 82 and 83 have the same taller height.

The first and second wedge sidewalls 82 and 83 each include a top 86 insertable in guide channels 18 and 19 of each shell sidewall 11 and 12. As best seen in FIG. 5, the first end 84 of the wedge 80 is insertable into the second end 14 of the shell 10, so that the shorter height of the wedge 80 fits into the larger height of the shell 10. The wedge base 81 slides along the outside surface of the shim 40. As the wedge 80 is pulled further into the shell 10, the wedge base 81 increasingly biases the shim 40 toward the shell base 15 of the shell 10 to sandwich the cable 2 between the shim 40 and the shell base 15. A hammer can be used to tap the wedge 80 into the shell 10 above the shim 40 to fully secure the cable 2 in the clamp 1. Alternatively, the wedge 80 can be pulled into the shell 10 using a tail wire 88 with a loop 89. The tail wire 88 is strongly secured to the wedge base 81.

When the wedge 80 is slid in the direction of arrow A and pushed or pulled tightly, the cable 2 is sandwiched between the shim 40 and the shell base 15 of the shell 10. The raised edges of the holes 47 of the shim 40 slightly dig into the outer upper surface of a jacket of the cable 2, and optional teeth on the shell base 15 may also slightly dig into the outer bottom surface of the jacket of the cable 2. The cable 2 will not easily slip within the clamp 1. More precisely, the weight of an aerial span of the cable 2 will not cause the cable 2 to slip in the direction opposite to arrow A in FIGS. 1 and 5 relative to the clamp 1.

The clamp 1 is designed to hold the cable 2 and to prevent the cable 2 from slipping therethrough. If the cable 2 is allowed to slip within the clamp 1, the aerial span of the cable 2 will sag, and the length of the downstream portion of the cable 2, i.e., the portion of the cable 2 between the clamp 1 and the building or pole and equipment connected to the cable 2, will decrease, which may place a kink in the cable or tension on downstream connectors and damage equipment and/or disconnect the cable 2 from downstream equipment.

SUMMARY OF THE INVENTION

If the aerial span of the cable is contacted by an external force, such as by contacting a tall truck or recreational vehicle (RV) or even rooftop mounted bicycles, canoes or suitcases, the force applied to the cable is excessive. In some cases, the cable may sever, typically at the clamp. In other cases, the clamp itself may break apart. In other cases, the clamp may remain intact and sever from the sturdy structure, e.g., the anchor bolt holding the loop 89 of the clamp 1 is pulled free from the study structure.

Sometimes, the cable, cable clamp, and clamp anchoring system are all so strong that the study structure is pulled toward the roadway, e.g., a roadside pole is bent or broken. To this end, a breakaway coupler 100 is on the market to be installed between the cable clamp mount, e.g., the loop 89 of FIGS. 1 and 3-5, and the sturdy structure. See U.S. Pat. Nos. 4,687,365; 5,599,129 and 7,290,748. The breakaway coupler 100 has a shear pin or fastener, which breaks at a preset load, e.g., 200 pounds, 400 pounds. The breakaway coupler 100 is designed to save the pole because a pole replacement or pole repair can be very costly.

FIG. 6 shows a roadway 101, which has a first pole 103 and a second pole 105 located on opposite sides of the roadway 101. A cable 2 has an aerial span 107 across the roadway 101. The weight of the aerial span 107 is supported by first and second clamps 1A and 1B.

The first clamp 1A is attached to the first pole 103 by a first breakaway coupler 100A. The second clamp 1B is attached to the second pole 105 by a second breakaway coupler 100B. The downstream portion of the cable 2 (i.e., the portion leading away from the roadway 101 from the second clamp 1B) includes several loops 109. An end of the downstream cable 2 is terminated to a connector 111, which is mated to a piece of equipment 113 mounted to the second pole 105. The several loops 109 of cable 2 are provided in case the equipment 113 is replaced or moved in the future and the connection port(s) of the new equipment is located in a more remote location. Typically, the loops 109 are loosely secured by a ratcheting tie, hook and loop fastener or windings of electrical tape and the loops 109 are secured or hung on the second pole 105.

If a tall truck 115 makes contact with the aerial span 107 of the cable 2, an excessive force will be applied to the cable 2. One of the first and second breakaway couplers 100A and 100B will disconnect first, even if both of the first and second breakaway couplers 100A and 100B are set to the same breakaway force, like 1,800 Newtons (about 400 pounds). In FIG. 7, an instance where the second breakaway coupler 100B has disconnected first is illustrated. A first part 100B' of the second breakaway coupler 100B is still attached to the top of the second pole 105. A second part 100B" of the second breakaway coupler 100B is located on the ground.

When the second breakaway coupler 100B separates into the first and second parts 100B' and 100B", the loops 109 of the cable 2 are quickly pulled free allowing additional slack to the aerial span 107. Next, the excessive force encounters resistance from the remaining, first breakaway coupler 100A and the connector 111 mated to the port of the equipment 113. Either the first breakaway coupler 100A will separate or something will break apart at the equipment 113 depending upon which is the weakest link.

Hopefully, the connector 111 will simply pull out of the port of the equipment 113 or the cable 2 will pull out of the connector 111. However, depending upon the cable and the connector orientations those attachments may be rather strong. For example, a compression type F-connector which is threaded onto a port 111 of the equipment 113, where the cable 2 extends at about a ninety degree angle away from the axis of the port of the equipment 113 may be a stronger connection than the outer face plate and underlying circuit boards within the equipment 113.

FIG. 7 shows the equipment 113 having a first piece 113' of the equipment 113 still attached to the second pole 105 and a second piece 113" of the equipment 113 with the port 111 still attached to the terminated end of the cable 2 lying on the ground. This might occur if the force to pull the front face off of the equipment 113 is less than the force needed to separate the first breakaway coupler 100A, e.g., less than 1800 Newtons (about 400 pounds). The equipment 113 can be rather expensive, such as a supplemental small cell site.

FIG. 8 illustrates a rare but potentially deadly scenario wherein contact with the aerial span 107 of the cable 2 by a vehicle has disconnected one of the breakaway couplers 100A or 100B, e.g., the second breakaway coupler 100B, but then the cable 2 passes free of the vehicle either over it or under it, and remains intact and attached to the other breakaway coupler 100B or 100A, e.g., the first breakaway coupler 100A, and the connector 111 remains connected to the port 111 of the equipment 113. The aerial span 114 is now much lower than intended by the original design. If a motorcyclist 117 or bicyclist contacts the lowered aerial span 114, a potentially deadly accident could occur.

FIG. 9 is a close-up view of a top area of the second pole 105, which illustrates the connections between the aerial span 107 of cable 2 and the second pole 105. The aerial span 107 of the cable 2 is attached to the second clamp 1B, as detailed with regard to FIGS. 1-5. The loop 89 of the tail wire 88 of the second clamp 1B is attached to the second part 100B" of the second breakaway coupler 100B by a first bolt 119. The first part 100B' of the second breakaway coupler 100B is attached to the pole 105 by second bolt 121, which passes through an opening in an eye bolt 123, anchored into the pole 105.

The Applicant has designed a new breakaway coupler which cuts the cable 2 as the breakaway coupler separates due to an excessive axial force transferred from the cable to the cable clamp. Once the cable is cut, it is much more likely to lie flat on the ground and not cause the potentially dangerous situation depicted in FIG. 8. Moreover, use of the new breakaway coupler can eliminate damage to the equipment 113, as no external force will be experienced by the ports of the equipment 113 supporting the connector(s) 111 of the cable 2.

These and other objects are accomplished by a breakaway coupler comprising: a main body; a secondary body, removably attached to said main body; a first attachment feature formed on said main body to permit attachment of said main body to a first structure; a second attachment feature formed on said secondary body to permit attachment of said secondary body to a second structure; a breakaway member connecting said main body to said secondary body, said breakaway member being designed to fracture when a load beyond a preset value is applied thereto so as to detach said main body from said secondary body; first and second aligned openings formed in sidewall portions of said main body; third and fourth aligned openings formed in sidewall portions of said secondary body; and a blade edge formed on a side edge of at least one of said first, second, third and fourth openings, and wherein when said main body and said secondary body are attached said first and third openings are at least partially aligned to allow a cable to pass therethrough, and said second and fourth openings are at least partially aligned to permit the cable to pass therethrough.

Moreover, these and other objects are accomplished by a breakaway coupler comprising: a main body; a secondary body, removably attached to said main body; a first attachment feature formed on said main body to permit attachment of said main body to a first structure; a second attachment feature formed on said secondary body to permit attachment of said secondary body to a second structure; a breakaway member connecting said main body to said secondary body, said breakaway member being designed to fracture when a load beyond a preset value is applied thereto, so as to detach said main body from said secondary body; a guide channel passing through an overlapped portion of said main body and said secondary body and communicating an environment outside said breakaway coupler to an interior area of said breakaway coupler; and a blade which passes across said guide channel to sever an object within the guide channel when said secondary body is detached from said main body.

Further, these and other objects are accomplished by a method of attaching a cable to a structure comprising: providing a cable clamp to frictionally hold the cable either directly or indirectly; connecting the cable clamp to a breakaway coupler; connecting the breakaway coupler to the structure; and inserting a length of the cable into a guide channel formed in the breakaway coupler.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 17A is a view of an end face of the breakaway fasteners of FIGS. 16 and 17;

FIG. 18 is a cross sectional view of a main body of the breakaway coupler of FIGS. 10-12;

FIG. 19 is a cross sectional view of a secondary body of the breakaway coupler of FIGS. 10-12;

DETAILED DESCRIPTION OF EMBODIMENTS OF THE INVENTION

Figure 1:
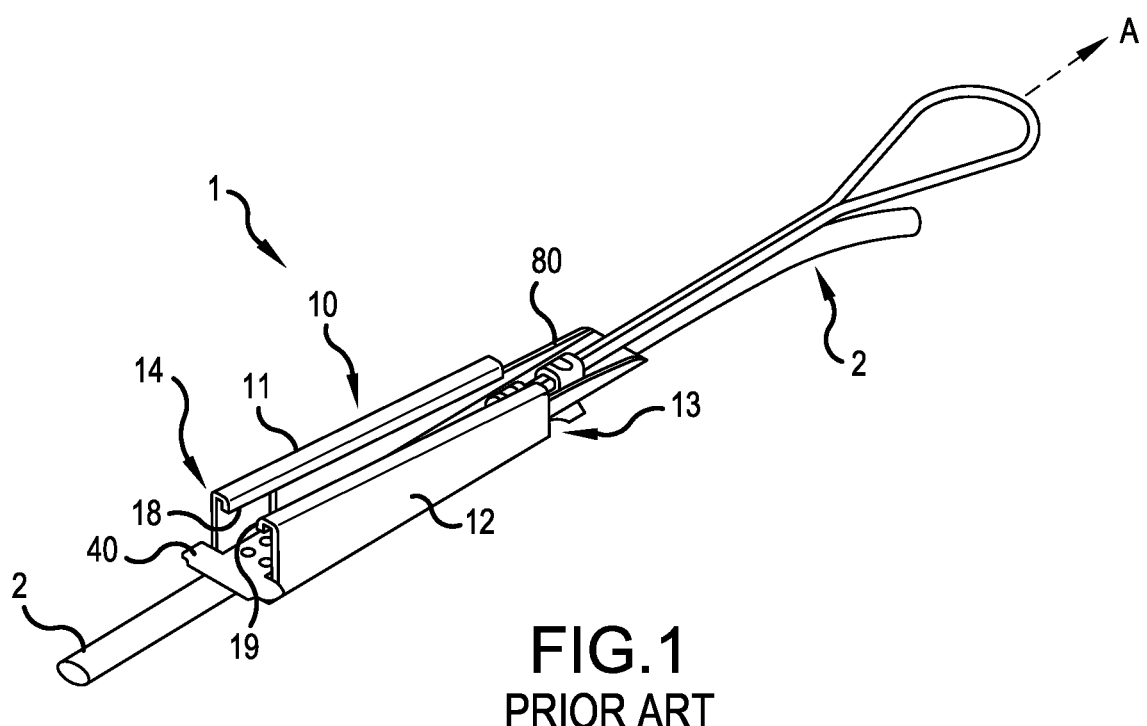
FIG. 1 is a perspective view of a cable clamp, in accordance with the prior art.
Figure 2:
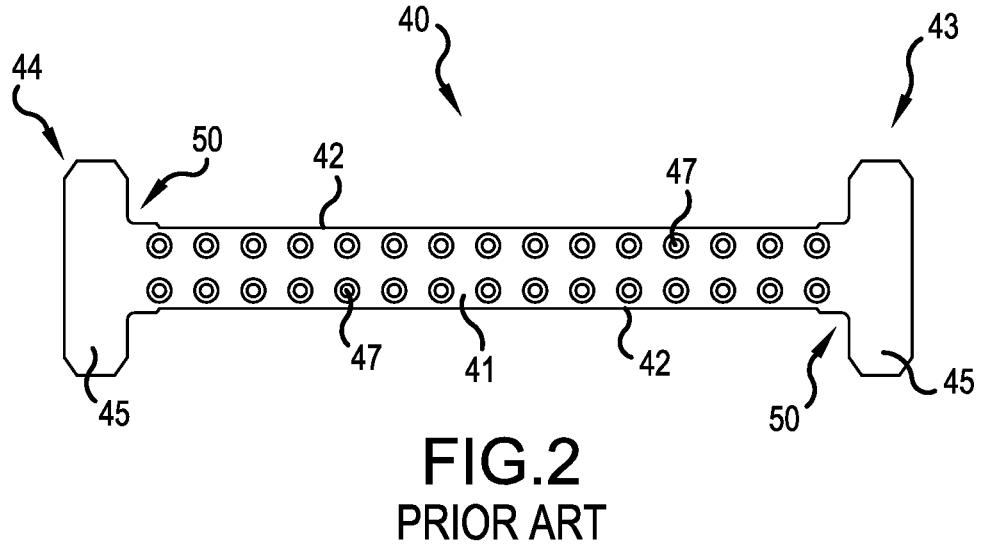
FIG. 2 is a top view of a shim of the clamp of FIG. 1.
Figure 3:
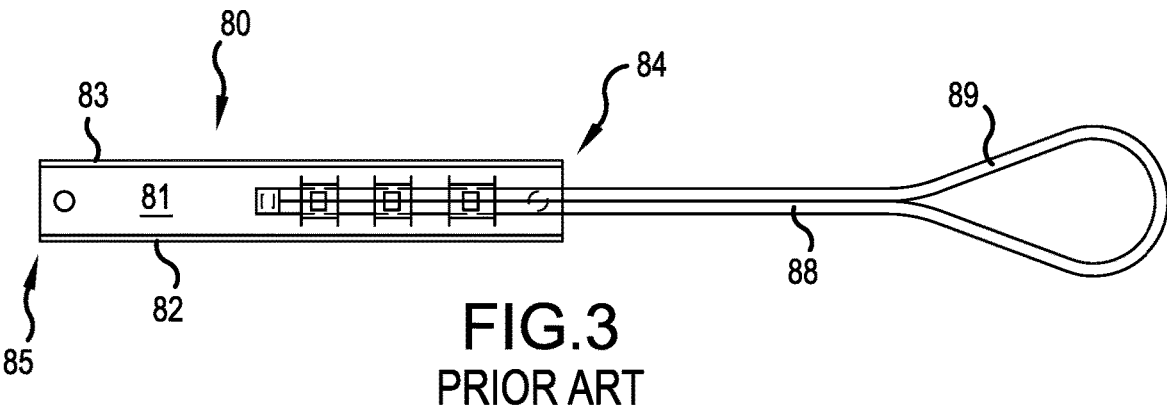
FIG. 3 is a top view of a wedge of the clamp of FIG. 1.
Figure 4:
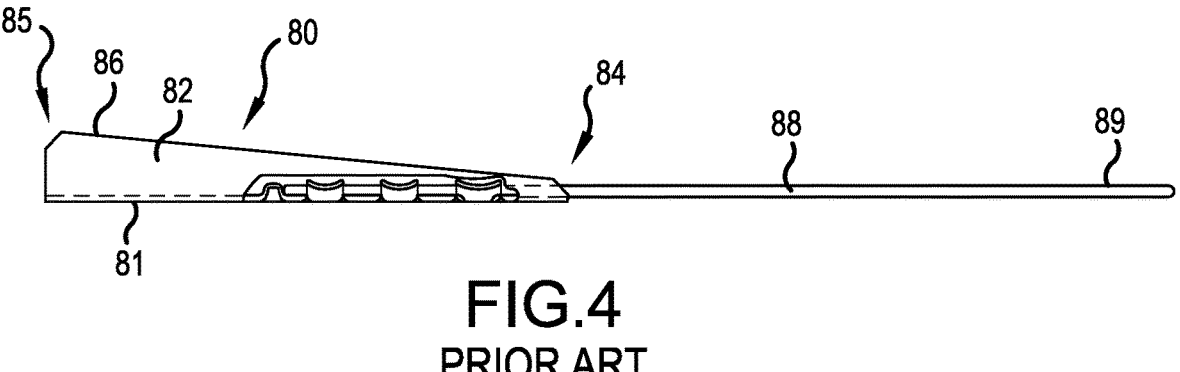
FIG. 4 is a side view of the wedge of FIG. 3.
Figure 5:
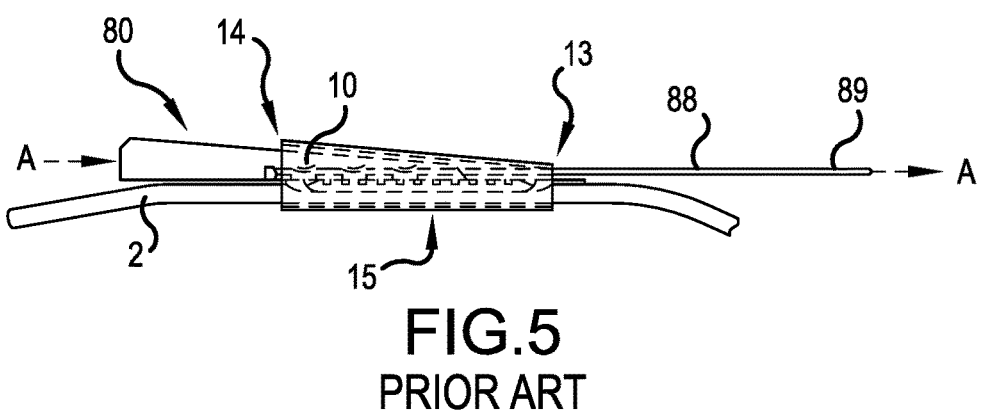
FIG. 5 is a side view of the clamp of FIG. 1, as the wedge of FIG. 4 is being inserted into a shell of the clamp.
Figure 6:
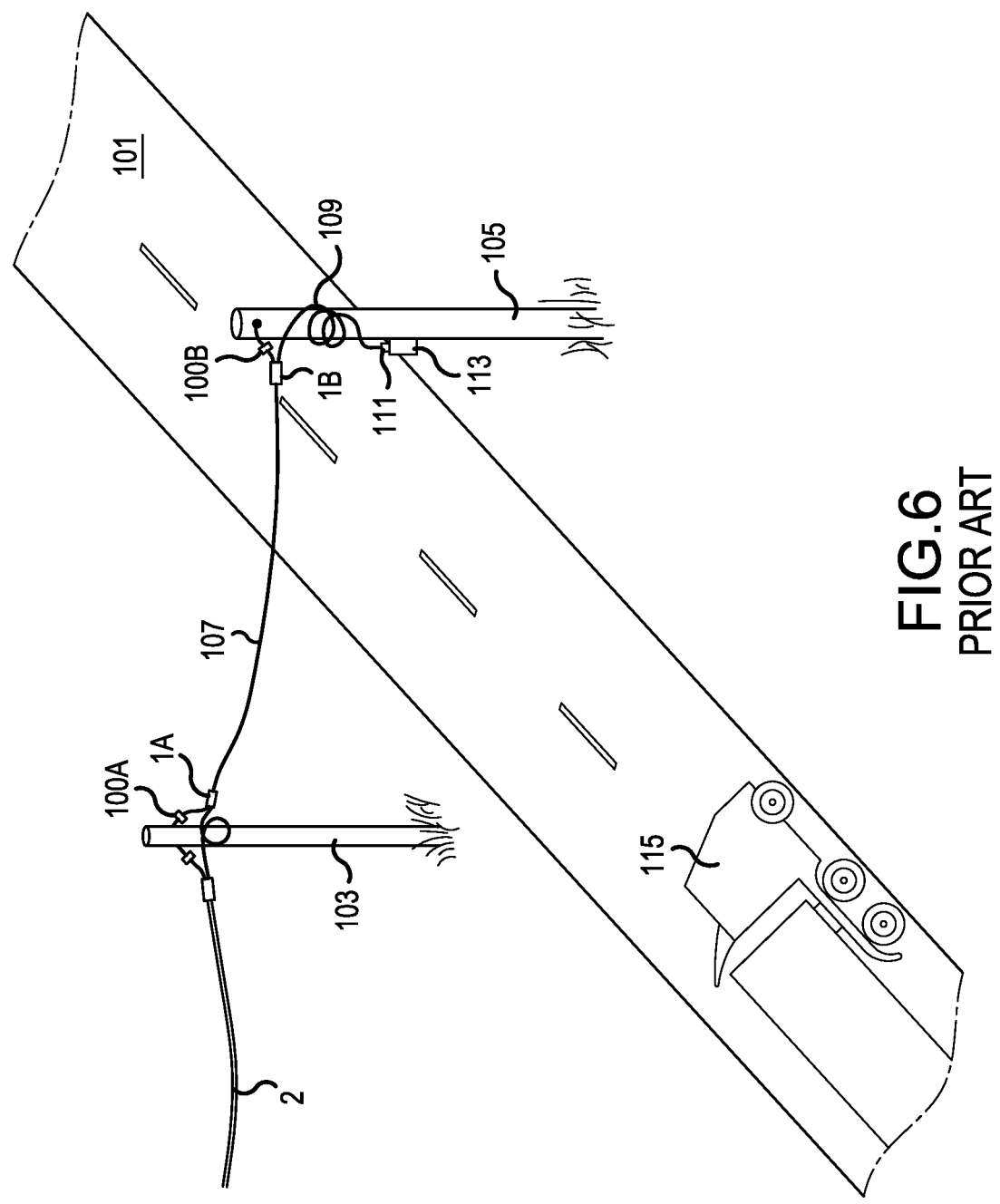
FIG. 6 shows a roadway with an aerial span of cable existing between first and second poles over the roadway, in accordance with the prior art.
Figure 7:
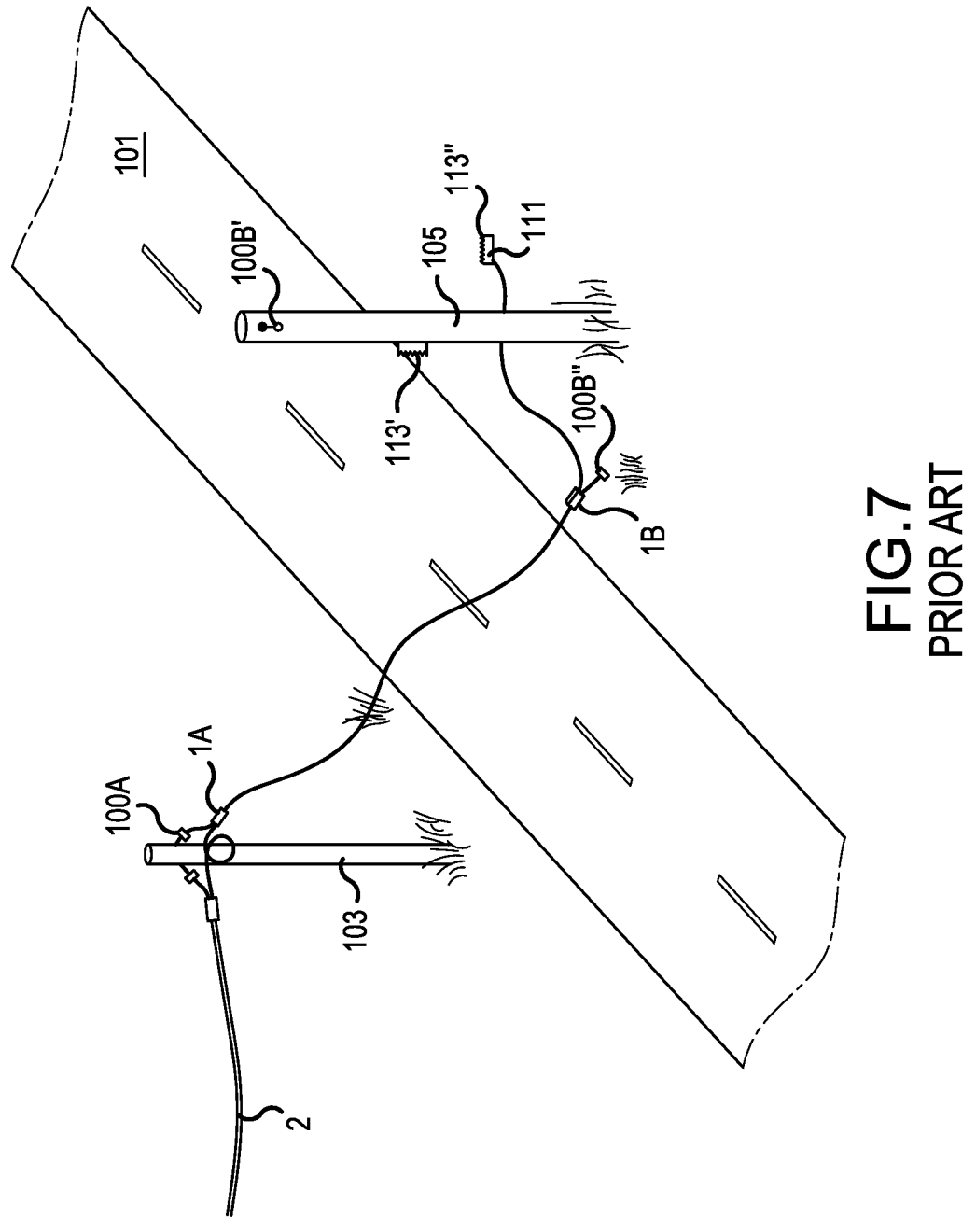
FIG. 7 shows the roadway of FIG. 6 after the aerial span has broken away from the second pole.
Figure 8:
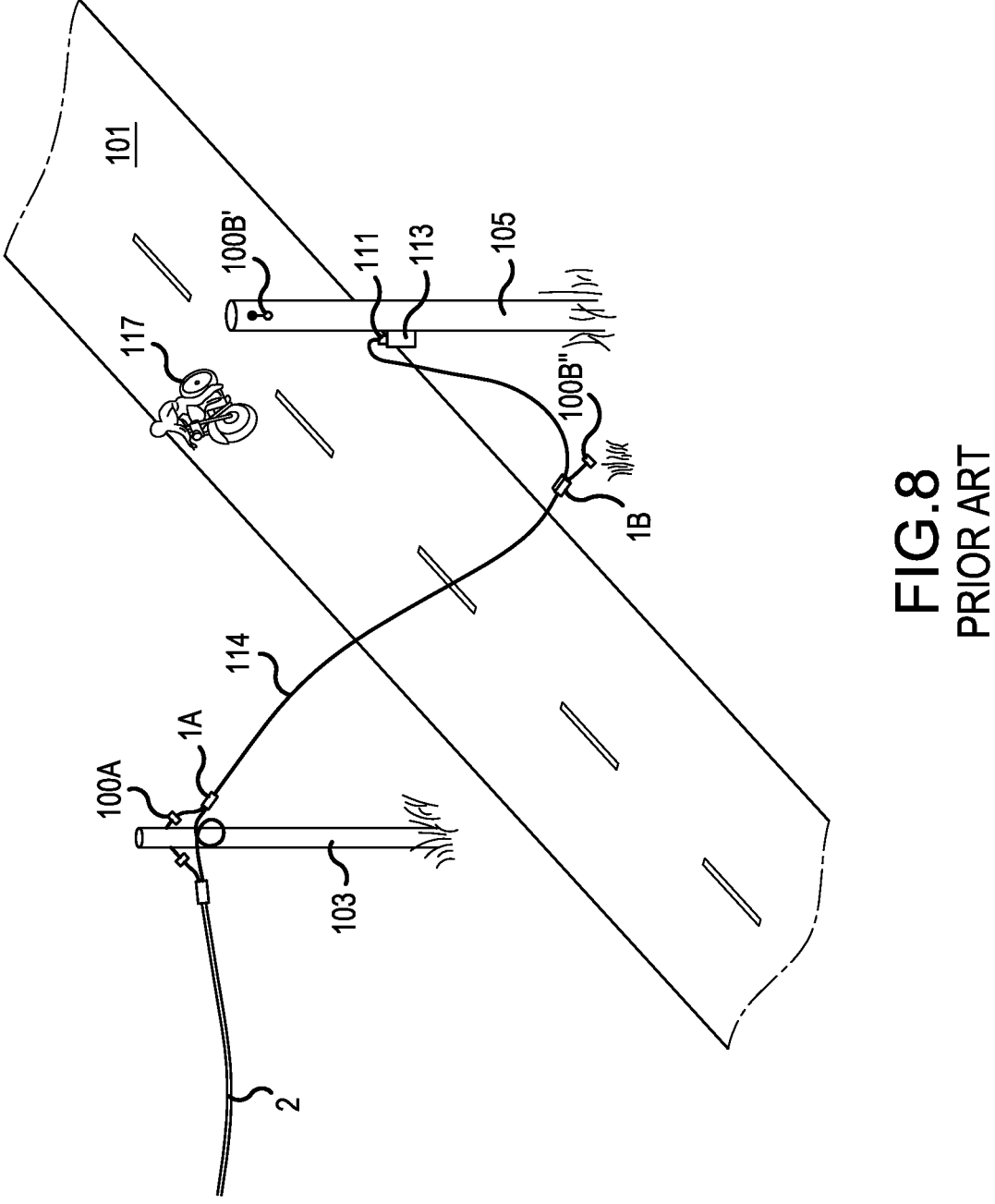
FIG. 8 shows the roadway of FIG. 6 when a dangerous lowered aerial span exists across the roadway.
Figure 9:
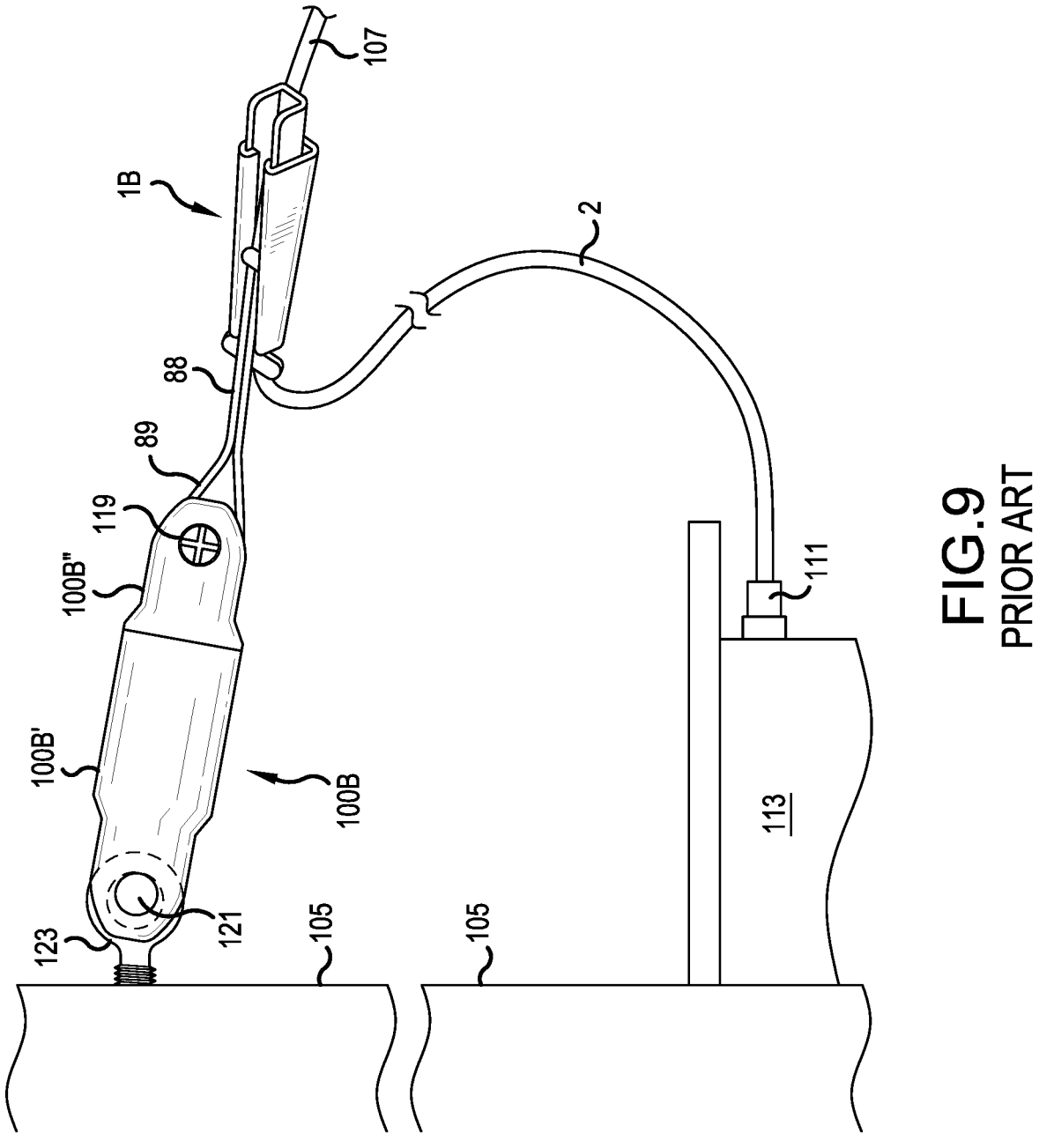
FIG. 9 is a close-up perspective view of attachments between the cable, clamp, breakaway coupler, pole and equipment attached to the pole, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 10:
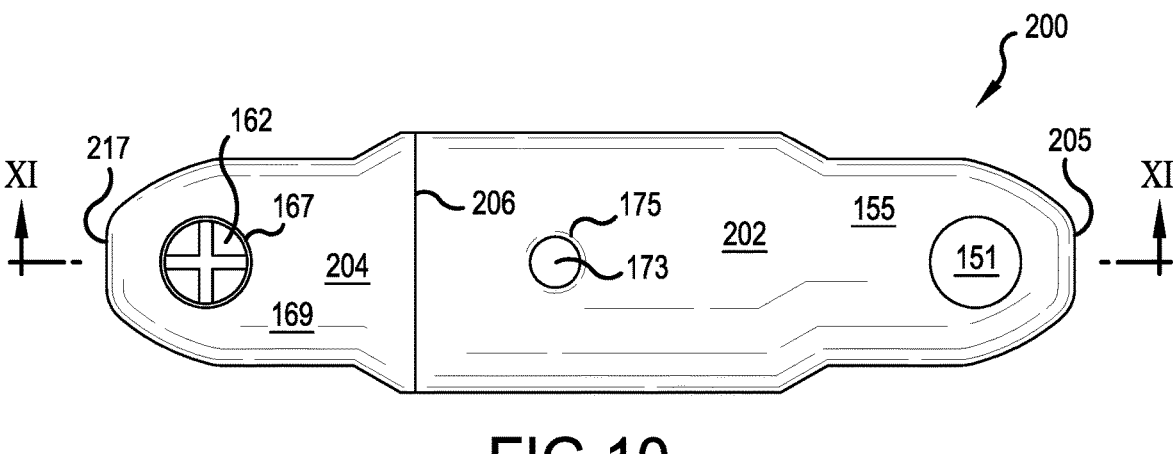
FIG. 10 is a top view of a breakaway coupler, in accordance with a first embodiment of the present invention.
Figure 11:
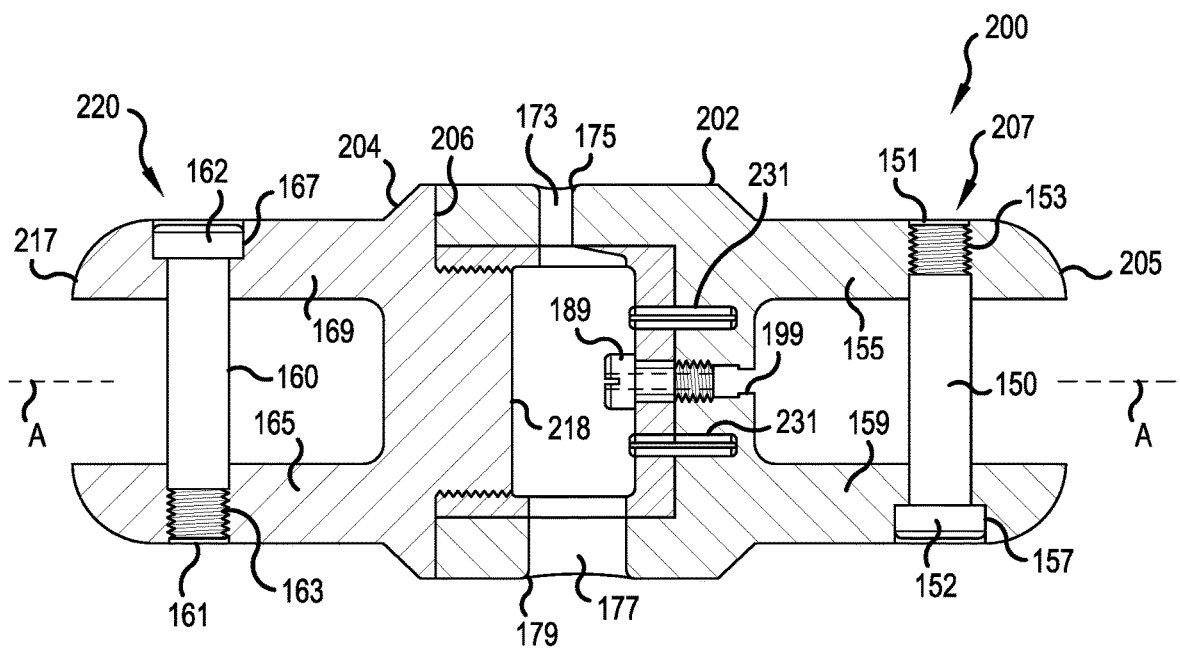
FIG. 11 is a cross sectional view taken along line XI-XI in FIG. 10.

FIG. 10 is a top view of a breakaway coupler 200, in accordance with the present invention. FIG. 11 is a cross sectional view taken along line XI-XI in FIG. 10. The breakaway coupler 200 includes a main body 202 and a secondary body 204. The main body 202 has first and second ends 205 and 206, respectively. The first end 205 includes a first attachment feature 207 to mechanically connect to a first structure, e.g., the loop 89 of the tail wire 88 of a cable clamp 1.

In the drawings, the first attachment feature 207 takes the form of a first bolt 150, which includes a threaded end 151 and a head 152 for engagement by a tool, e.g., a socket wrench, TORX head driver or screwdriver. The first bolt 150 has its threaded end 151 engaged into a first threaded through hole 153 formed in a first ear 155 of the first end 205 of the main body 202. The first bolt 150 is has its head 152 seated into a recess 157 formed in a second ear 159 of the first end 205 of the main body 202. The main body 202 and the secondary body 204 have a common central axis A. The first bolt 150 passes approximately perpendicularly through the central axis A.

The secondary body 204 has first and second ends 217 and 218, respectively. The first end 217 includes a second attachment feature 220 to mechanically connect to a second structure, e.g., the eye bolt 123 anchored to a pole 105. In the drawings, the second attachment feature 220 takes the form of a second bolt 160, which includes a threaded end 161 and a head 162 for engagement by a tool, e.g., a socket wrench, TORX head driver or screwdriver. The second bolt 160 is has its threaded end 161 engaged into a second threaded through hole 163 formed in a first ear 165 of the first end 217 of the secondary body 204. The second bolt 160 has its head 162 seated into a recess 167 formed in a second ear 169 of the first end 217 of the secondary body 204. The second bolt 160 passes approximately perpendicularly through the central axis A.

Disassembled cross sectional views of the main and secondary bodies 202 and 204 are illustrated in FIGS. 18 and 19. The main body 202 includes a central bore 208. The central bore 208 is sized to accept a chamber 203, as will discussed in detail later. A back wall 171 of the central bore 208 includes a longitudinal pathway 213. Threads 227 are formed on at least a portion of walls defining the longitudinal pathway 213. One or more apertures 176 are also formed in the back wall 171.

The central bore 208 is formed by a cylindrical wall 229, which is formed integrally with, and extends away from the back wall 171. A first opening 173 is formed in the cylindrical wall 229 and connects the outer environment to the central bore 208. The first opening 173 may be circular and have a gradual, smooth radius 175 formed around its juncture with the outer surface of the cylindrical wall 229 to prevent micro-bending of a cable passing therethrough. A second opening 177 is formed in the cylindrical wall 229 and connects the outer environment to the central bore 208. The second opening 177 may be formed as a rectangular slot and may have a gradual, smooth radius 179 formed around its juncture with the outer surface of the cylindrical wall 229 to likewise prevent micro-bending. The second opening 177 is located one hundred eighty degrees away from, i.e., on the opposite side of cylindrical wall 229 from, the first opening 173, and is much larger in size as compared to the first opening 173 to easily facilitate passing a cable through the main body 202.

As best seen in FIG. 19, the second end 218 of the secondary body 204 includes shaft 219 which extends away from a shoulder 228. Threads 224 are formed around an outer circumference of the shaft 219. The threads 224 are sized to engage with threads 225 within the chamber 203, as will be described next.

Figure 13:
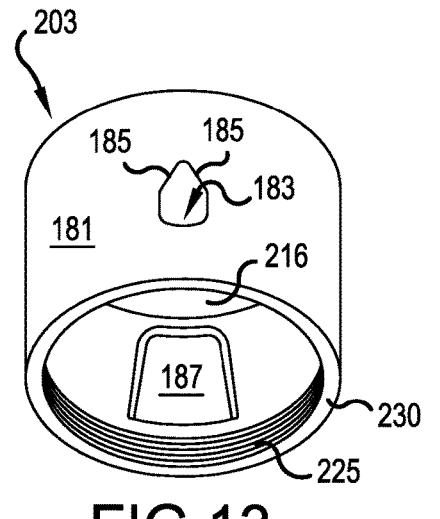
FIG. 13 is a front, top perspective view of a chamber within the breakaway coupler of FIGS. 10-12.
Figure 15:
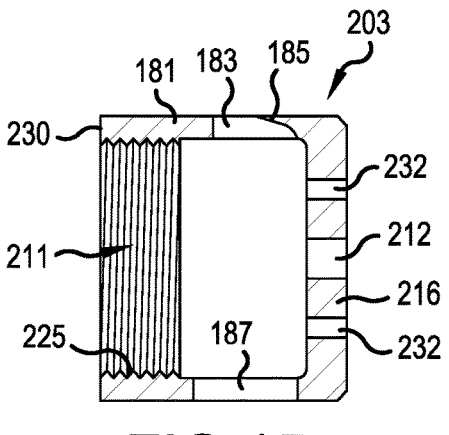
FIG. 15 is a cross sectional view taken along line XV-XV in FIG. 14.
Figure 14:
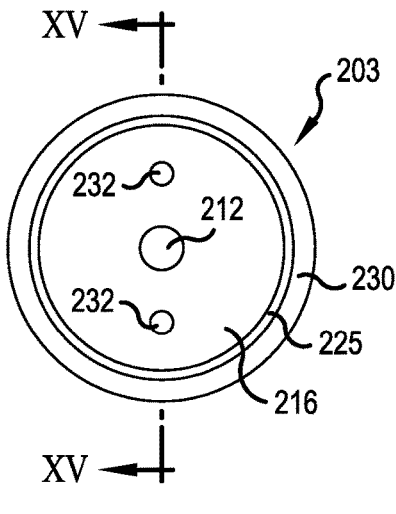
FIG. 14 is a front view of the chamber.

FIGS. 13-15 illustrate the chamber 203 in a disassembled state. FIG. 13 is a front, top perspective view of the chamber 203. FIG. 14 is a front view of the chamber 203, and FIG. 15 is a cross sectional view of the chamber taken along line XV-XV in FIG. 14.

The chamber 203 is generally cup-shaped, having a cylindrical outer wall 181 extending away from a rear face 216. An open end 230 is located opposite the rear face 216, such that a central area 211 is formed inside of the cylindrical outer wall 181. On an inner surface of the cylindrical outer wall 181 threads 225 are formed proximate the open end 230. The threads 225 allow the chamber 203 to be screwed onto the shaft 219 of the secondary body 204, so that the open end 230 abuts the shoulder 228 of the secondary body 204.

The cylindrical outer wall 181 includes a tear-drop shaped, third opening 183. The third opening 183 connects the outer environment to the central area 211 of the chamber 203. The side edges of the third opening 183, closer to the rear face 216, are sharpened to form a blade edge 185, as best seen in FIG. 15. This sharpened side edge may be V-shaped, as illustrated, or present an angled guillotine-shape.

A fourth opening 187 is formed in the cylindrical outer wall 181 and connects the outer environment to the central area 211 of the chamber 203. The fourth opening 187 is located one hundred eighty degrees away from, i.e., on the opposite side of cylindrical outer wall 181 from, the third opening 183. The fourth opening 187 may have a rectangular shape and is much larger in size as compared to the third opening 183 to facilitate passing a cable through the chamber 203.

Figure 12:
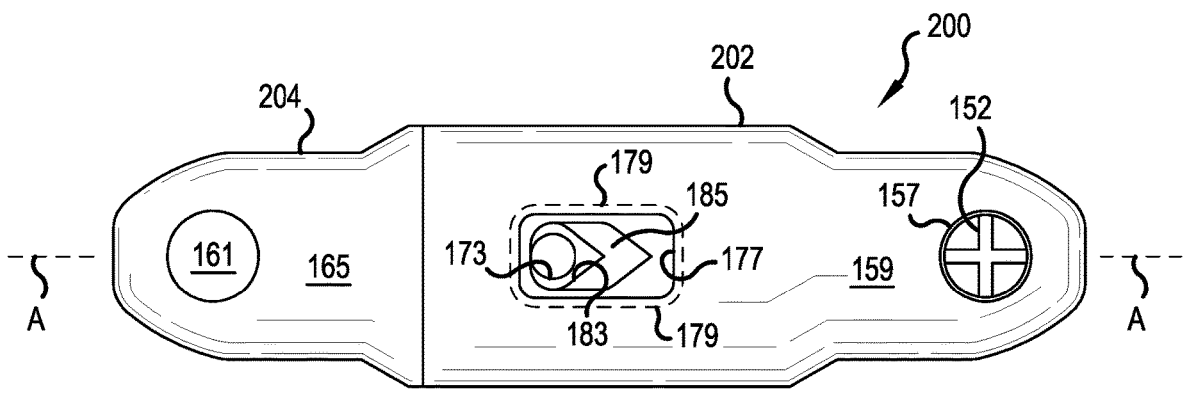
FIG. 12 is a bottom view of the breakaway coupler of FIG. 10.

The rear face 216 includes a central passageway 212. The central passageway 212 is centered on the central axis A of the breakaway coupler 200 (See FIGS. 11 and 12). The rear face 216 also includes one or more alignment apertures 232, such as the two alignment apertures 232 illustrated in FIGS. 11, 14 and 15. Threads 225 are formed on an inside surface of the cylindrical outer wall 181 proximate the open end 230.

To assemble the chamber 203, main body 202 and secondary body 204, the chamber 203 is slid into the central bore 208 of the main body 202. Torsion pins 231 (see FIG. 11) are passed through the alignment apertures 232 in the rear face 216 of the chamber 203 and into the apertures 176 in the back wall 171 of the main body 202. The torsion pins 231 may be formed as a rolled piece of resilient metal, which has an open gap. Each torsion pin 231 is slightly larger than the aperture 176 accepting the torsion pin 231, so that the open gap is slightly closed by the smaller diameter of the aperture 176, and the resiliency of the metal forming the torsion pin 231 causes the torsion pin 231 to be frictionally engaged within the aperture 176.

The torsion pins 231 cause the first and third openings 173 and 183 to become overlapped and aligned to allow a cable to pass therethrough, and also cause the second and fourth openings 177 and 187 to become overlapped and aligned to permit the cable to pass therethrough, as well. The aligned first, second, third and fourth openings 173, 177, 183 and 187 may be considered to form a guide channel passing through overlapped portions of the main body 202 and the chamber 203. A breakaway member, such as a breakaway fastener 215A or 215B is inserted through the central passageway 212 and screwed into the threads 227 within the longitudinal pathway 213 of the main body 202. Then, the shaft 219 of the secondary body 204 is screwed into the chamber 203.

Figure 16:
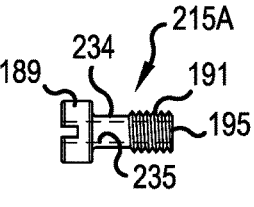
FIG. 16 is a side view of a breakaway fastener, in accordance with a first embodiment.

FIG. 16 is a side view of the breakaway fastener 215A, in accordance with a first embodiment. The breakaway fastener 215A has a head 189 at a proximal end for engagement by a tool, e.g., a socket wrench, TORX head driver or screwdriver. A distal end of the breakaway fastener 215A has a screw thread 191 to engage with the threads 227 within the longitudinal pathway 213 of the main body 202. The breakaway fastener 215A is screwed into the longitudinal pathway 213 until the head 189 abuts a portion of the chamber 203 to attach the chamber 203 to the main body 202.

In the first embodiment, a bore 235 passes through a center of the breakaway fastener 215A. The bore 235 causes a cylindrical sidewall 234 of the breakaway fastener 215A to be thin. The sidewall 234 will be the fracture point of the breakaway fastener 215A when the breakaway fastener 215A is subjected to a tensile load beyond a preset value—the thinner the sidewall 234, the lower the preset value. Once the breakaway fastener 215A fractures the main body 202 is detached from the secondary body 204.

Figure 17:
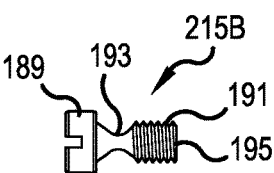
FIG. 17 is a side view of a breakaway fastener, in accordance with a second embodiment.

FIG. 17 is a side view of the breakaway fastener 215B, in accordance with a second embodiment. The breakaway fastener 215B has a head 189 at a proximal end for engagement by a tool, e.g., a socket wrench, TORX head driver or screwdriver. A distal end of the breakaway fastener 215B has a screw thread 191 to engage with the threads 227 within the longitudinal pathway 213 of the main body 202. The breakaway fastener 215B is screwed into the longitudinal pathway 213 until the head 189 abuts a portion of the chamber 203 to attach the chamber 203 to the main body 202.

In the second embodiment, between the head 189 and the screw thread 191 is a necked-down portion 193. The necked-down portion 193 will be the fracture point of the breakaway fastener 215B when the breakaway fastener 215B is subjected to a tensile load beyond a preset value—the smaller the diameter of the necked-down portion 193, the lower the preset value. Once the breakaway fastener 215B fractures the main body 202 is detached from the secondary body 204.

The breakaway fasteners 215A and 215B each have a distal face 195 at the distal end. FIG. 17A is a front view of the distal face 195. The distal face 195 includes a feature 197 for engagement by a tool to impart a rotation to the breakaway fastener 215A or 215B. The feature 197 may take the form of a recessed box for a box bit (as illustrated), a recessed slot for a regular screwdriver, a TORX fitting for a TORX driver, etc. The feature 197 may be engaged by a tool to impart a rotation to the breakaway fastener 215A and 215B. An aperture 199 is formed in the main body 202 and leads to the longitudinal pathway 213 to allow the tool to gain access to the feature 197.

The breakaway fasteners 215A and 215B may be designed to fracture at a preset value, such as 700 Newtons, 800 Newtons, 1,000 Newtons, or any other desired preset value, such as 1,700 Newtons. After the breakaway fastener 215A or 215B has fractured, e.g., the head 189 has broken off, the remaining distal end of the breakaway fastener 215A or 215B may be unscrewed from the thread 227 in the longitudinal pathway 213 using a tool engaging the feature 197. Then, a new breakaway fastener 215A or 215B may be inserted to reassemble and reuse the breakaway coupler 200.

Figure 20:
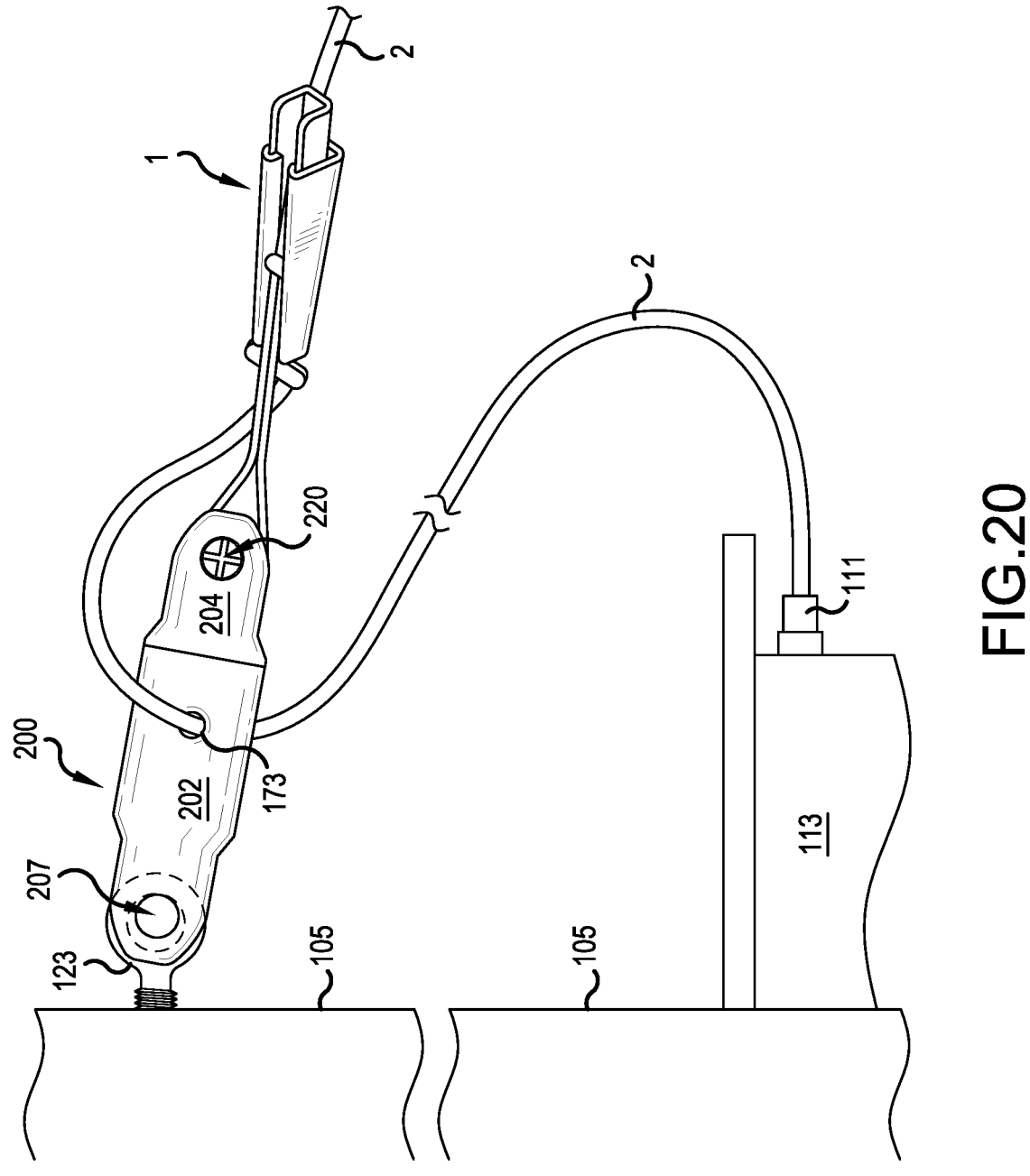
FIG. 20 is a close-up perspective view of attachments between the cable, clamp, breakaway coupler, pole and equipment attached to the pole, in accordance with the present invention.

FIG. 20 depicts the clamp 1 attached to the second attachment feature 220 of the secondary body 204 of the breakaway coupler 200. The main body 202 of the breakaway coupler 200 is attached to a pole 105 by the first attachment feature 207. A section of the cable 2 is directly held by the clamp 1. After exiting the clamp 1, a length of the cable 2 is routed through the aligned first, second, third and fourth openings 173, 177, 183 and 187. In FIG. 20, a section of the cable 2 is directly held by the cable clamp 1 by a friction engagement between the cable clamp 1 and a jacket of the cable 2.

Figure 21:
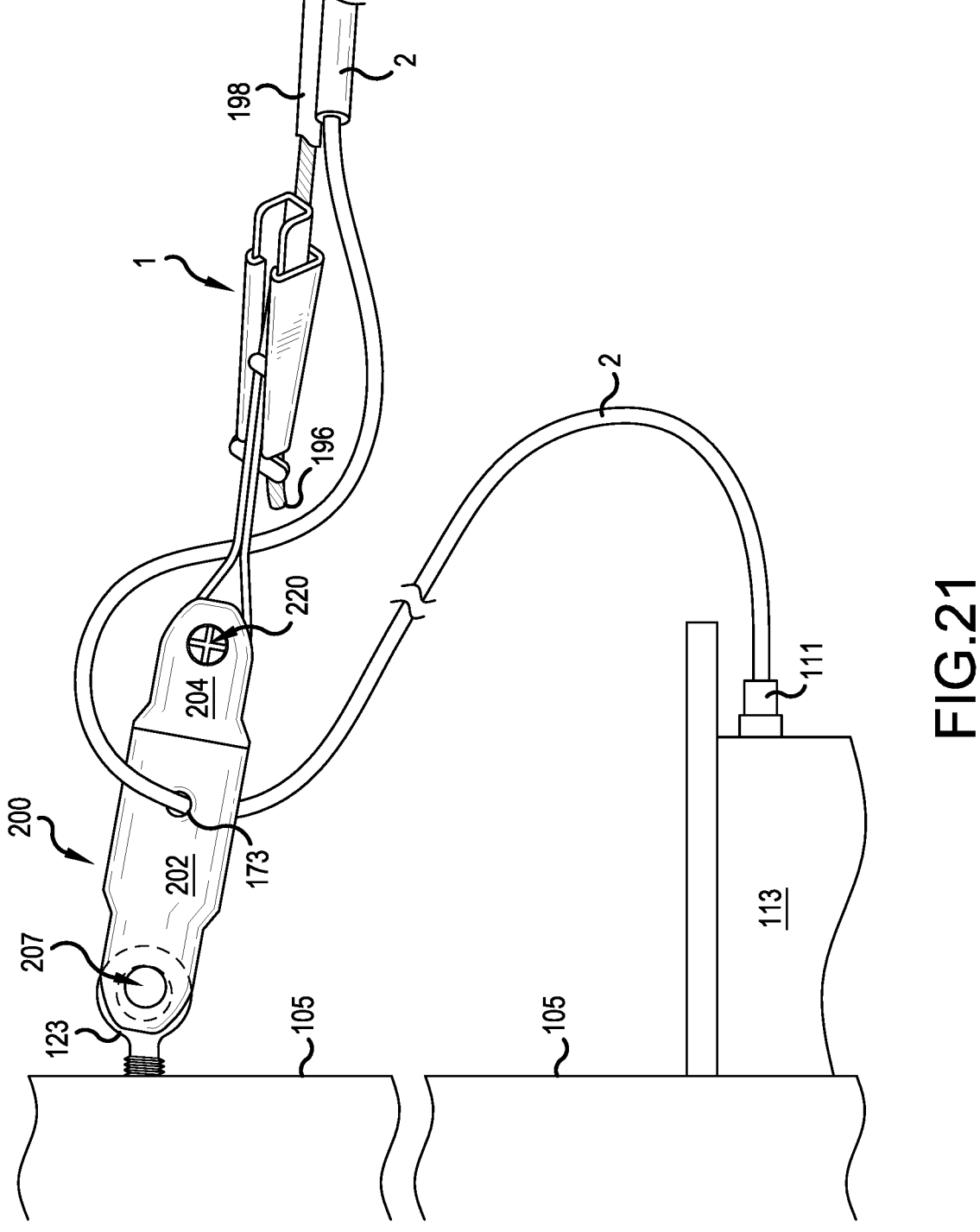
FIG. 21 is the same view as FIG. 20, but illustrates the use of the present invention where the cable has a messenger wire attached thereto.

FIG. 21 is similar to FIG. 20 in that FIG. 21 depicts the clamp 1 connected to the second attachment feature 220 of the secondary body 204 of the breakaway coupler 200, and the main body 202 of the breakaway coupler 200 is connected to a structure, e.g., the pole 105, by the first attachment feature 207. However in FIG. 21, the cable 2 is indirectly held by the clamp 1. The cable 2 has a messenger wire 198. A messenger wire 198 is typically a stranded steel wire connected to the cable 2 by a continuous web of the jacketing material. If a messenger wire 198 is present, it is best to subject the messenger wire 198 to the friction engagement within the clamp 1. The messenger wire 198 may be cut after passing through the clamp 1 to form end 196. The cable 2 is pulled or cut free from the messenger wire 198 prior to the clamp 1, and a length of the cable 2 is routed through the aligned first, second, third and fourth openings 173, 177, 183 and 187 of the breakaway coupler 200.

If an excessive force is applied to the cable 2 or messenger wire 198, e.g., if a vehicle contacts the cable 2 or messenger wire 198, an axial load in excess of a preset value will be transferred to the breakaway coupler 200 and the breakaway fastener 215A or 215B will fracture. After the breakaway fastener 215A or 215B fractures, the main body 202 and the secondary body 204 separate. The blade edge 185 on the side of the third opening 183 slides completely over the first opening 173 as the secondary body 204 and the chamber 203 attached thereto slides out of the main body 202. Hence, the blade edge 185 passes across the guide channel holding the cable 2 to sever the cable 2, when the secondary body 204 is detached from the main body 202.

The main body 202, secondary body 204 and chamber 203 may be formed of a metal or alloy, such as stainless steel, galvanized steel, or aluminum. If the breakaway fastener 215A or 215B is formed of a metal or alloy susceptible to rust or corrosion, it may be advantageous to cover the head 189 and fill the aperture 199 with a caulk or sealant to prevent corrosion which could change the preset value for fracturing of the breakaway fastener 215A or 215B.

The first, second, third and fourth openings 173, 177, 183 and 187 may be sized to accept the largest cable or cables to be severed by the breakaway coupler 200, such as one or more fiber optic cables, one or more twisted pair cables, one or more coaxial cables, and/or one or more power cables. If one or more of the cables is pre-terminated to a connector, the first and third openings 173 and 183 may be enlarged to permit a connector to pass therethrough as shown in FIGS. 22-23.

Figure 22:
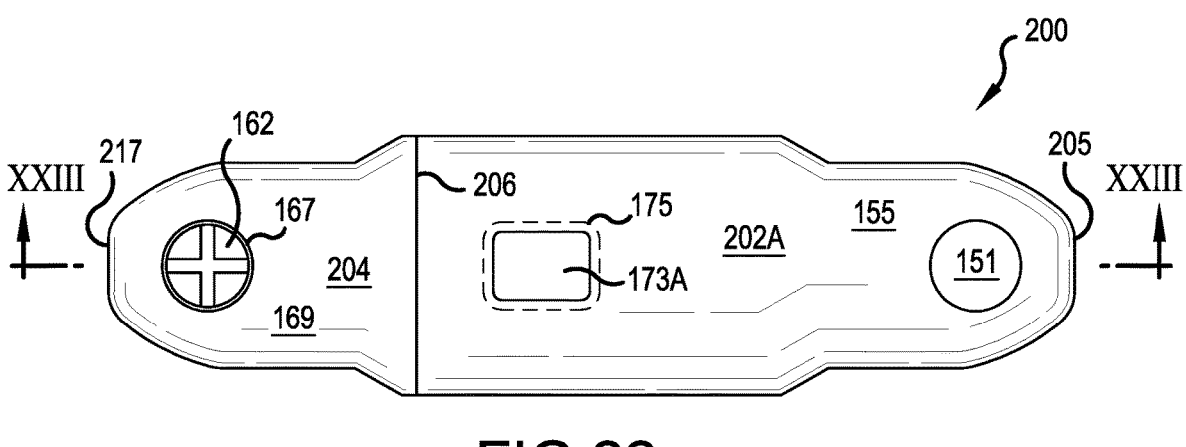
FIG. 22 is a top view of a breakaway coupler, in accordance with a second embodiment of the present invention.
Figure 23:
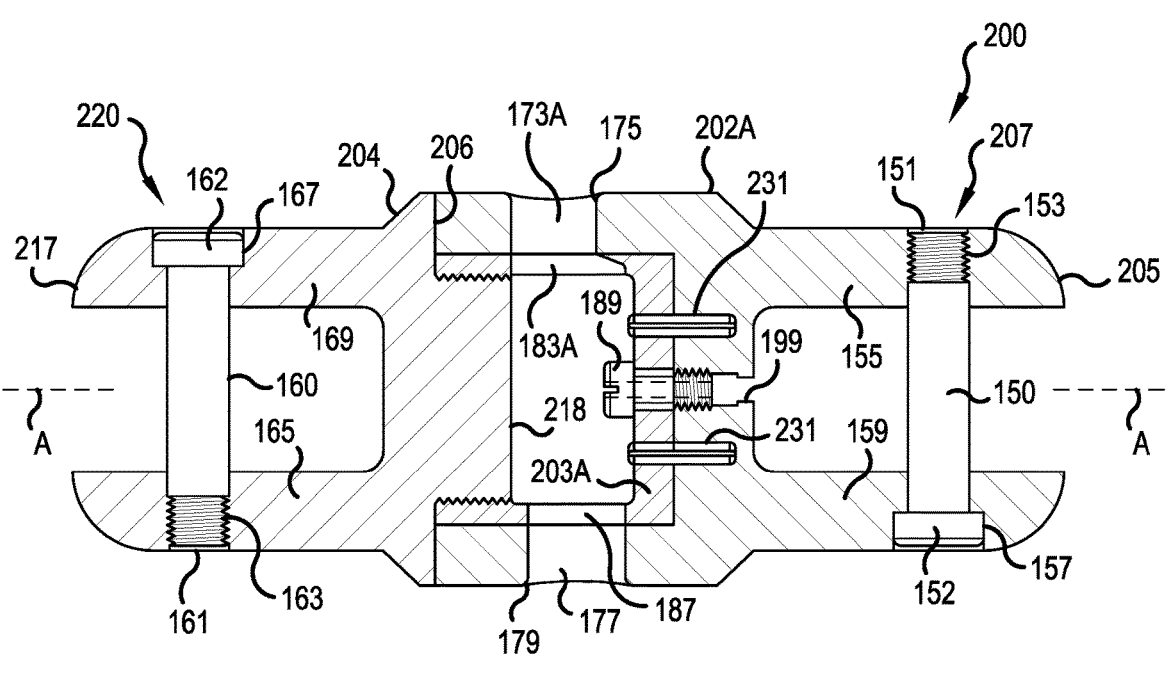
FIG. 23 is a cross sectional view taken along line XIII-XIII in FIG. 22.

FIG. 22 is a top view of a breakaway coupler, in accordance with a second embodiment of the present invention, while FIG. 23 is a cross sectional view taken along line XXIII-XXIII in FIG. 22. FIGS. 22 and 23 are identical to FIGS. 10 and 11, but illustrate enlarged first and third openings 173A and 183A in a first alternative main body 202A and a first alternative chamber 203A, respectively. The dimensions of the enlarged first opening 173A and the enlarged third opening 183A permit a connector to pass therethrough. Therefore, a pre-connectorized cable may pass into the first alternative chamber 203A and out the fourth opening 187 of the first alternative chamber 203A and the second opening 177 in the first alternative main body 202A.

Figure 24:
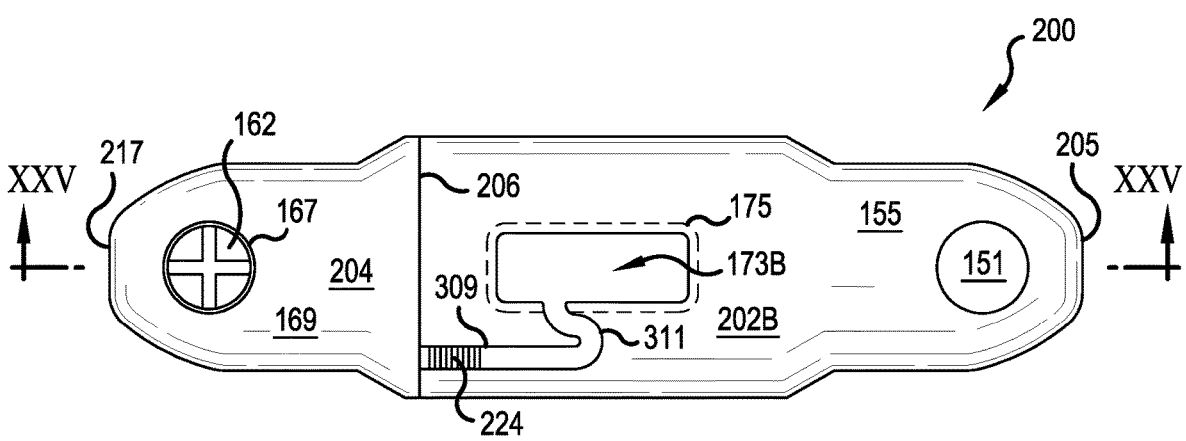
FIG. 24 is a top view of a breakaway coupler, in accordance with a third embodiment of the present invention.
Figure 25:
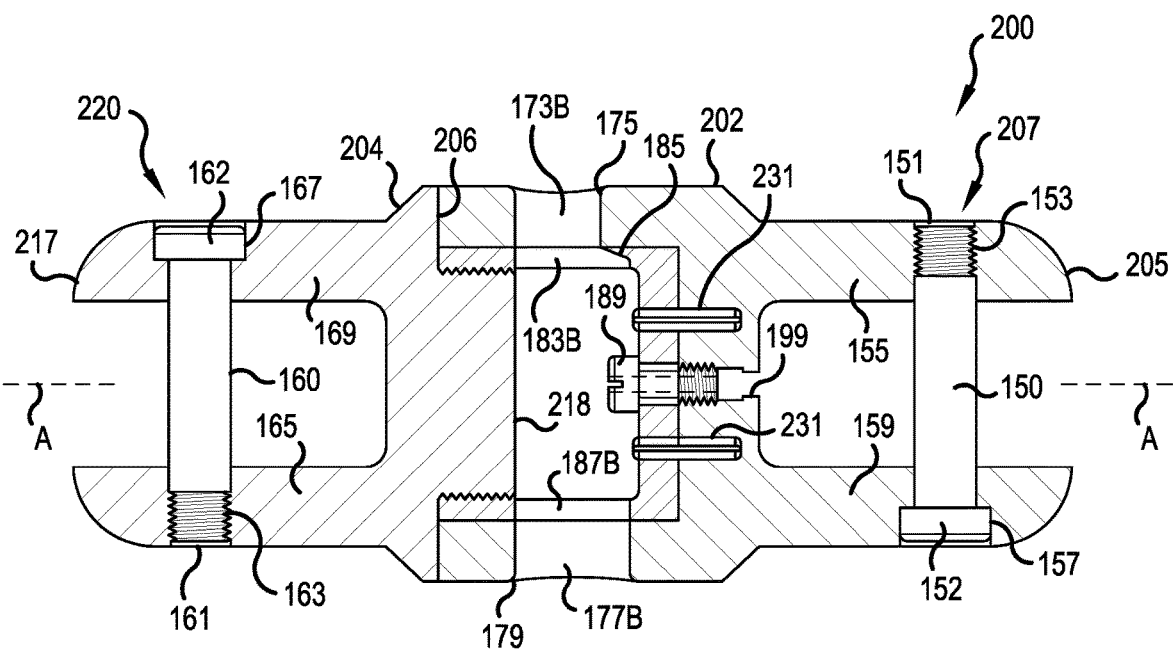
FIG. 25 is a cross sectional view taken along line XV-XV in FIG. 24.
Figure 26:
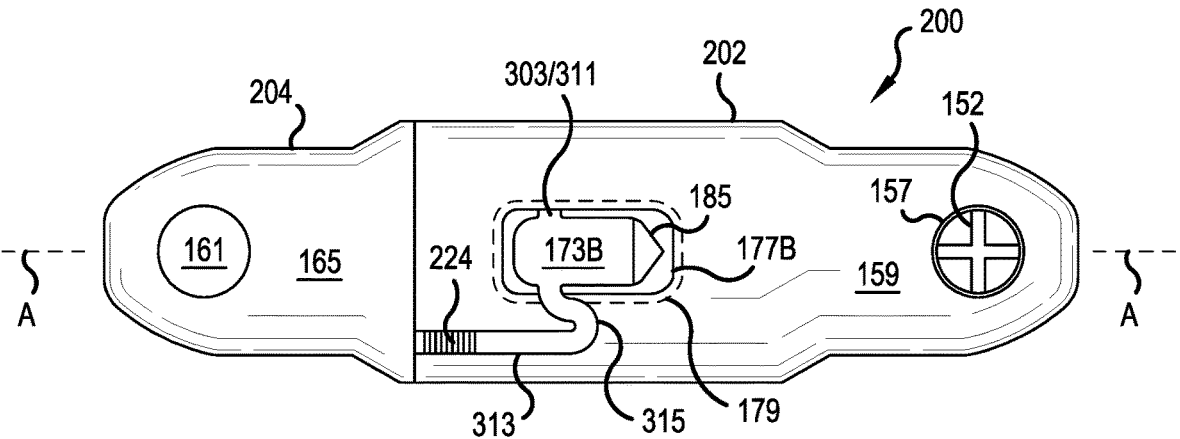
FIG. 26 is a bottom view of the breakaway coupler of FIG. 24.

FIG. 24 is a top view of a breakaway coupler, in accordance with a third embodiment of the present invention. FIG. 26 is a bottom view of the breakaway coupler of FIG. 24, and FIG. 25 is a cross sectional view taken along line XV-XV in FIG. 24. FIGS. 24-26 are identical to FIGS. 10-12 but illustrate first and second slotted openings 173B and 177B formed in a second alternative main body 202B.

The first slotted opening 173B includes a large rectangular through hole formed in the cylindrical wall 219 of the second alternative main body 202B. A first slot 309 connects the rectangular through hole to the second end 206 of the second alternative main body 202B. The first slot 309 includes a first serpentine curve 311. The second slotted opening 177B includes a large rectangular through hole formed in the cylindrical wall 219 of the second alternative main body 202B, on a side opposite to the first slotted opening 173B. A second slot 313 connects the rectangular through hole to the second end 206 of the second alternative main body 202B. The second slot 309 includes a second serpentine curve 315.

Figure 27:
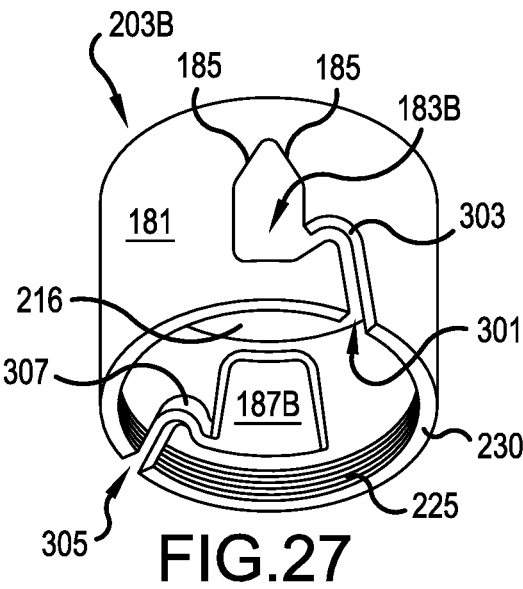
FIG. 27 is a front, top perspective view of a chamber within the breakaway coupler of FIGS. 24-26.
Figure 29:
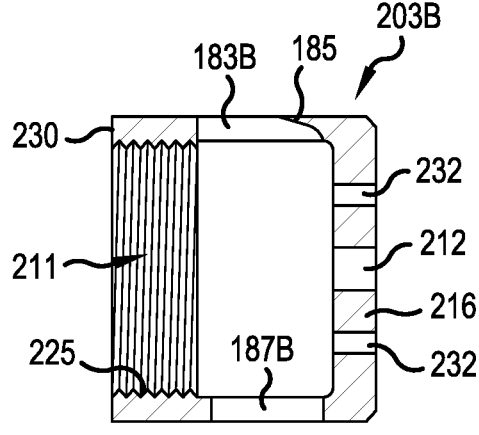
FIG. 29 is a cross sectional view taken along line XXIX-XXIX in FIG. 28.
Figure 28:
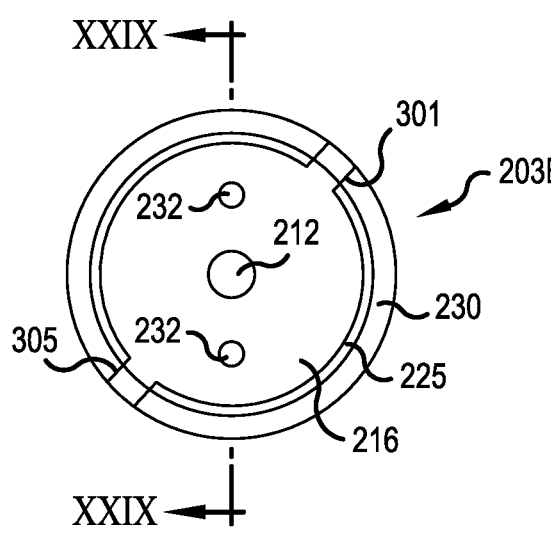
FIG. 28 is a front view of the chamber of FIG. 27.

FIGS. 27-29 depict a second alternative chamber 203B. The third opening 183 has been replaced by a third slotted opening 183B, and the fourth opening 187 has been replaced by a fourth slotted opening 187B. The third slotted opening 183B includes a large rectangular through hole formed in the cylindrical outer wall 181 of the second alternative chamber 203B. A third slot 301 connects the rectangular through hole to the open end 230 of the second alternative chamber 203B. The third slot 301 includes a third serpentine curve 303. The fourth slotted opening 187B includes a large rectangular through hole formed in the cylindrical outer wall 181 of the second alternative chamber 203B. A fourth slot 305 connects the rectangular through hole to the open end 230 of the second alternative chamber 203B. The fourth slot 305 includes a fourth serpentine curve 307.

In operation, the second alternative chamber 203B is mounted into the central bore 208 of the second alternative main body 202B. When the torsion pins 231 are inserted into the apertures 176 and the breakaway fastener 215A/215B is seated, the first slotted opening 173B and its first slot 309 will align to the third slotted opening 183B and its third slot 301. Also, the second slotted opening 177B and its second slot 313 will align to the fourth slotted opening 187B and its fourth slot 305.

In this aligned state, a first section of cable may be passed laterally into the aligned first and third slots 309 and 301, and a second section of that same cable may be passed laterally into the aligned second and fourth slots 313 and 305. The cable may be laterally directed through the first, second, third and fourth serpentine curves 311, 315, 303 and 307, and then passed into the first, second, third and fourth slotted openings 173B, 177B, 183B and 187B.

Additional cables may be passed into the first, second, third and fourth slotted openings 173B, 177B, 183B and 187B by the same operation. Once the cables are loaded, the threads 224 on the shaft 219 of the secondary body 204 are screwed into the threads 225 inside of the second alternative chamber 203B. A portion of the threads 224 will be visible through the first, second, third and fourth slots 309, 313, 301 and 305. At this point, the cables are captured in the large rectangular through holes and are unlikely to enter to the slots 309, 313, 301 and 305 due to the serpentine curves 311, 315, 303 and 307 and the natural resiliency of the cables. This second alternative allows mid-spans of cables to be side-loaded into the breakaway coupler 200 instead of having to thread each cable through the aligned openings in the breakaway coupler 200, which can be advantageous when the end of a cable is not locally present, e.g., has already been routed to a distance piece of equipment or to another pole, and when it is important to load a cable without disconnecting its communication path.

The outer jacketing of cables need not be removed prior to passing the cable or cables through the aligned first, second, third and fourth openings 173, 177, 183 and 187. It is preferred that the jacketing remain intact as the interior of the breakaway coupler 200 is not sealed to the outer environment. The blade edge 185 and construction of materials used to form the breakaway coupler 200 are designed to cut though the jacket, and all of the internal components of the cable to include shielding layers, kelvar fibers, GRP rods, dielectric tapes/isolotators/flutes, drain wires, insulated wires, and ribbon cables, twisted pairs, optical fibers, coaxial cables, etc. The close nesting relationship of the cylindrical outer wall 181 of the chamber 203, 203A, 203B and the cylindrical wall 229 of the main body 202, 202A 202B, as well as the cylindrical shapes result in an extremely strong scissor action type of cutting. This scissor action can easily cut through commonly employed cable materials, especially when the action is driven by a force level required to fracture the breakaway fastener 215A or 215B.

The invention being thus described, it will be obvious that the same may be varied in many ways.

The invention claimed is:

1. An aerial cable mounting system responsive to excessive tension in the cable to sever the cable comprising:
   a main body;
   a secondary body, removably attached to said main body;
   a first mechanical attachment connector formed on said main body to permit attachment of said main body to a first structure;
   a second mechanical attachment connector formed on said secondary body to permit attachment of said secondary body to a second structure;
   a breakaway member connecting said main body to said secondary body to form a breakaway coupler, said breakaway member being designed to fracture when a load beyond a preset value is applied thereto so as to detach said main body from said secondary body;
   first and second aligned openings formed in sidewall portions of said main body;
   third and fourth aligned openings formed in sidewall portions of said secondary body; and
   a blade edge formed on a side edge of at least one of said first, second, third and fourth openings, and wherein when said main body and said secondary body are attached, said first and third openings are at least partially aligned to allow a cable to pass therethrough, and said second and fourth openings are at least partially aligned to permit the cable to pass therethrough.

2. The aerial cable mounting system according to claim 1, further comprising:
   a clamp, and wherein said clamp is considered said first structure;
   a pole, and wherein said pole is considered said second structure; and
   a cable, where a section of said cable is held by said clamp, and a length of said cable passes through said first and third aligned openings and also passes through said second and fourth aligned openings to be severed in response to excessive tension in said cable.

3. The aerial cable mounting system according to claim 1, wherein said main body and said secondary body have a common central axis, wherein said first mechanical attachment connector includes a first bolt removably attached to said main body, and said first bolt passes approximately perpendicularly through said central axis, and wherein said second mechanical attachment connector includes a second bolt removably attached to said secondary body, and said second bolt passes approximately perpendicularly through said central axis.

4. The aerial cable mounting system according to claim 1, wherein said secondary body has said second mechanical attachment connector formed at a first end of said secondary body, and wherein a second end of said secondary body includes a chamber removably attached thereto, said chamber housing at least a portion of said breakaway member, and said chamber including said third and fourth aligned openings.

5. The aerial cable mounting system according to claim 4, wherein said chamber is attached to said secondary body by a threaded engagement.

6. The aerial cable mounting system according to claim 4, wherein said breakaway member is formed as a breakaway fastener with a head formed at a proximal end for engagement by a tool to impart a rotation to said breakaway fastener, and a screw thread formed at a distal end of said breakaway fastener, wherein said head abuts a portion of said chamber and said screw thread is engaged within a threaded hole formed within said main body to attach said secondary body to said main body.

7. The aerial cable mounting system according to claim 6, wherein said breakaway fastener has a distal face at said distal end, and wherein said distal face includes a feature for engagement by a tool to impart a rotation to said breakaway fastener.

8. The aerial cable mounting system according to claim 6, further comprising:
   one or more alignment pins passing through one or more apertures in said chamber and into one or more apertures within said main body, wherein said alignment pins cause the alignment of said first and third openings of said main and secondary bodies, and also cause the alignment of said second and fourth openings of said main and secondary bodies.

9. The aerial cable mounting system according to claim 4, further comprising:
   a first slot formed in sidewall portions of said main body which connects said first opening to an end of said main body;
   a second slot formed in sidewall portions of said main body which connects said second opening to said end of said main body;
   a third slot formed in said chamber which connects said third opening to an end of said chamber; and
   a fourth slot formed in said chamber which connects said fourth opening to said end of said chamber.

10. The aerial cable mounting system according to claim 9, wherein when said chamber is attached to said second end of said secondary body and said secondary body is attached to said main body, said first slot is aligned with said third slot and said second slot is aligned with said fourth slot.

11. The aerial cable mounting system according to claim 9, further comprising:
   first, second, third and fourth serpentine curves formed in said first, second, third and fourth slots, respectively.

12. An aerial cable mounting system responsive to excessive tension in the cable to sever the cable comprising:
   a main body;
   a secondary body, removably attached to said main body;
   a first mechanical attachment connector formed on said main body to permit attachment of said main body to a first structure;
   a second mechanical attachment connector formed on said secondary body to permit attachment of said secondary body to a second structure;
   a breakaway member connecting said main body to said secondary body, said breakaway member being designed to fracture when a load beyond a preset value is applied thereto, so as to detach said main body from said secondary body;
   a guide channel passing through an overlapped portion of said main body and said secondary body and communicating an environment outside said breakaway coupler to an interior area of said breakaway coupler; and a blade which passes across said guide channel to sever the cable within the guide channel when said secondary body is detached from said main body in response to excessive tension in the cable.

13. The aerial cable mounting system according to claim 12, wherein said main body and said secondary body have a common central axis, wherein said breakaway member is formed as a breakaway fastener with a head formed at a proximal end for engagement by a tool to impart a rotation to said breakaway fastener, and a screw thread formed at a distal end of said breakaway fastener, and wherein said breakaway fastener attaches said secondary body to said main body.

14. The aerial cable mounting system according to claim 13, wherein said breakaway fastener extends along said central axis and has a distal face at said distal end, wherein said distal face includes a feature for engagement by a tool to impart a rotation to said breakaway fastener and further comprising:

an aperture formed in one of said main and secondary bodies to gain access to said feature of said distal face to unscrew said screw thread at said distal end of said breakaway fastener from a threaded hole after the breakaway fastener fractures.

15. The aerial cable mounting system according to claim 12, wherein said secondary body has said second mechanical attachment connector formed at a first end of said secondary body, and wherein a second end of said secondary body includes a chamber removably attached thereto, said chamber housing at least a portion of said breakaway member.

16. The aerial cable mounting system according to claim 15, wherein said chamber is attached to said secondary body by a threaded engagement, wherein said breakaway member is formed as a breakaway fastener with a head formed at a proximal end for engagement by a tool to impart a rotation to said breakaway fastener, and a screw thread formed at a distal end of said breakaway fastener, wherein said head abuts a portion of said chamber and said screw thread is engaged within a threaded hole formed within said main body to attach said secondary body to said main body.

\* \* \* \* \*